Feb. 13, 1973   J. MITTLER ET AL   3,716,157
APPARATUS FOR LOADING OF CARGO ONTO AND UNLOADING
CARGO FROM A VEHICLE
Filed Oct. 1, 1971   6 Sheets-Sheet 4
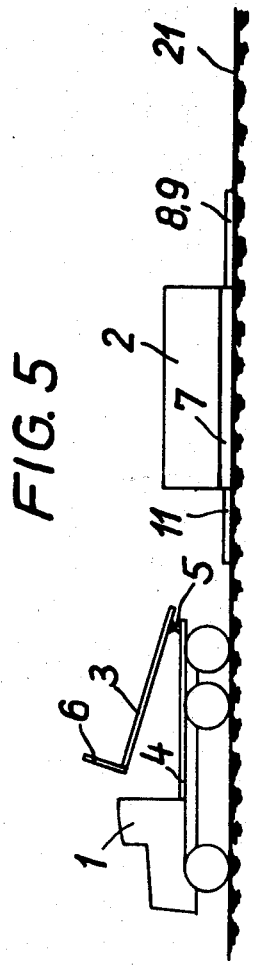
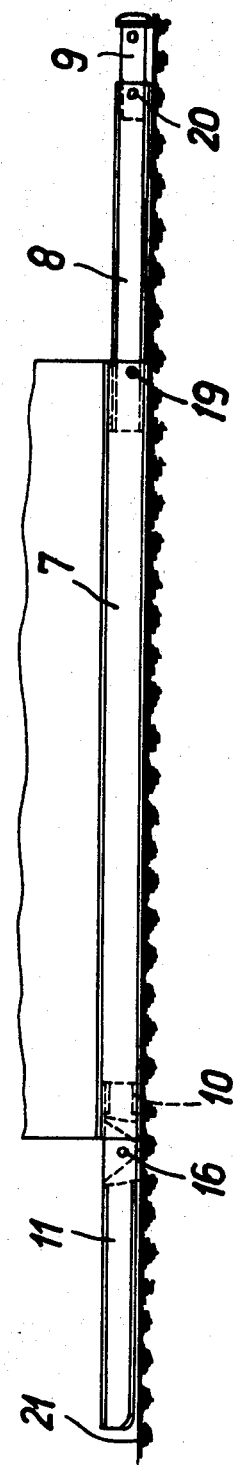
Inventors:
Johannes Mittler
Karl Schardey Inventors:
Johannes Mittler
Karl Schardey

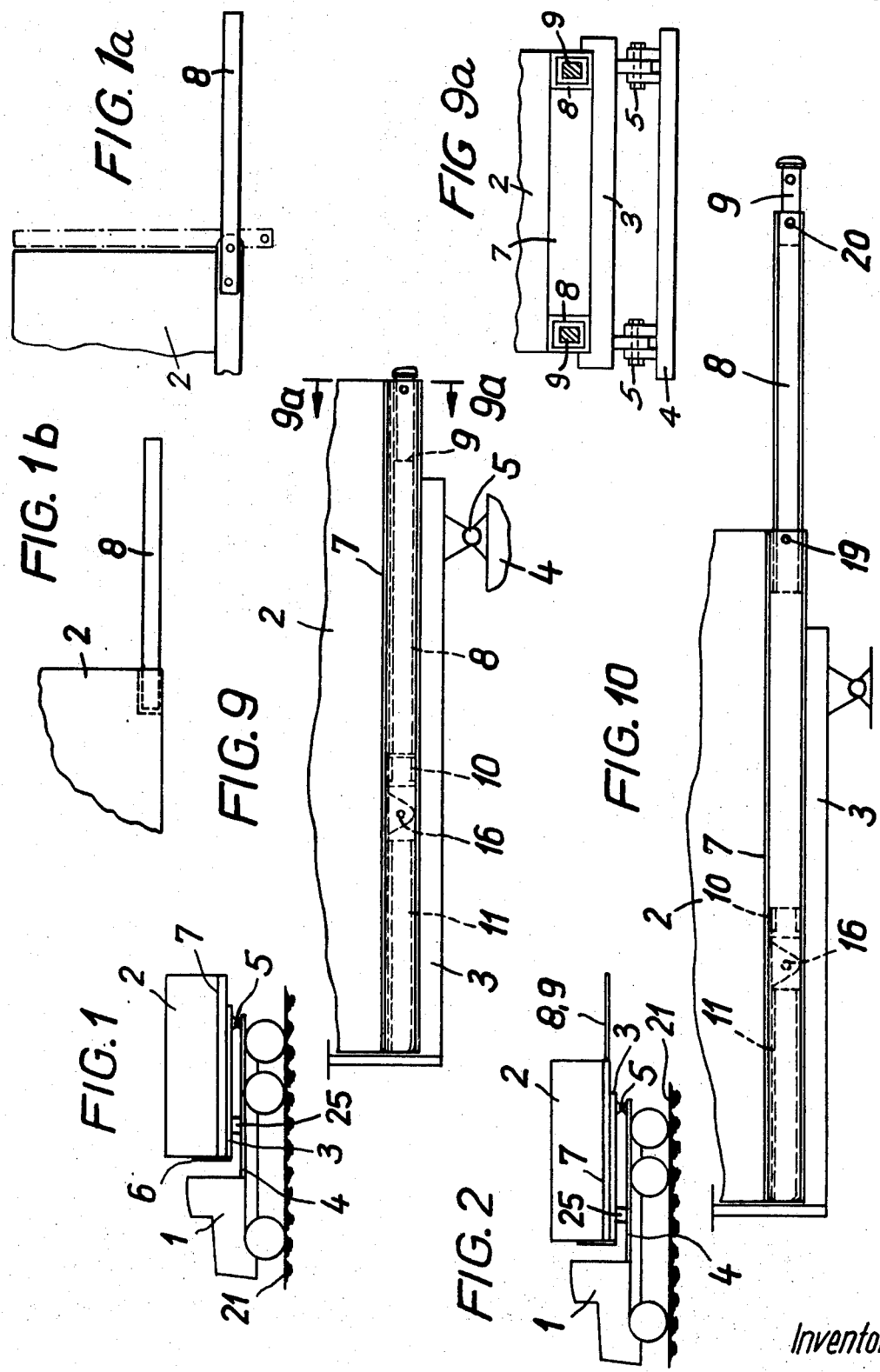

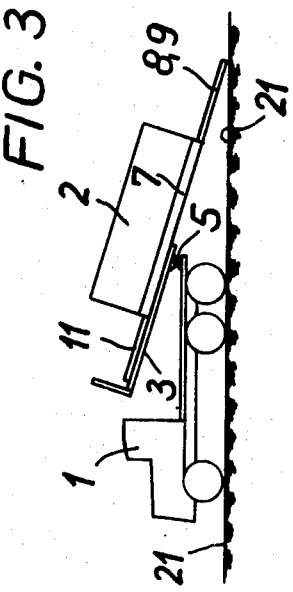
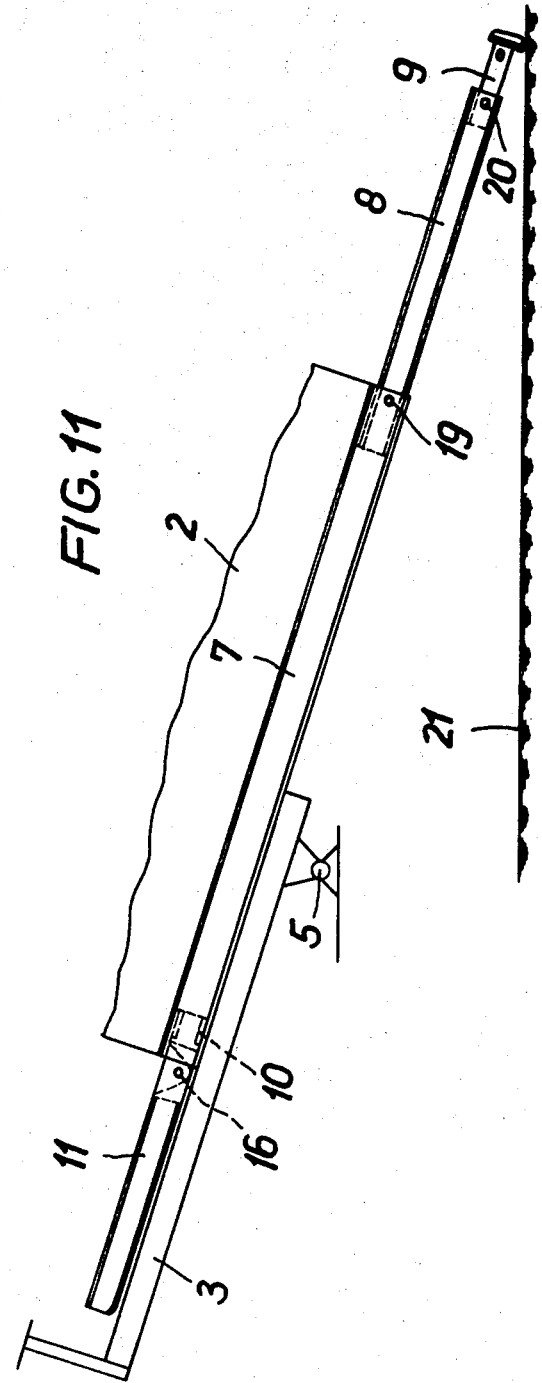

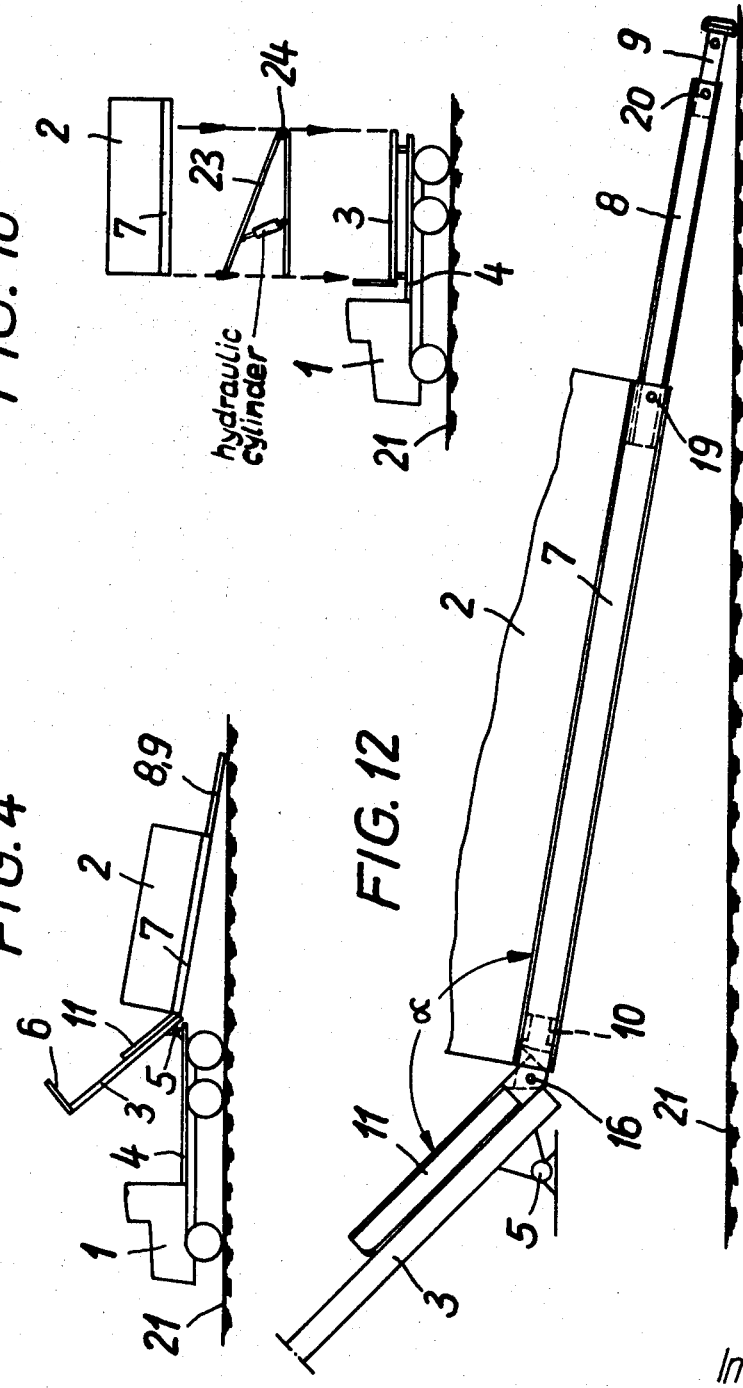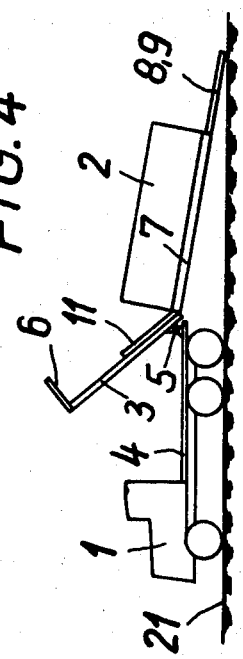

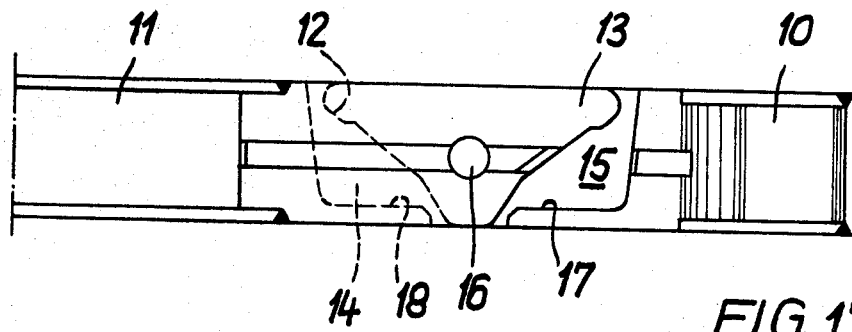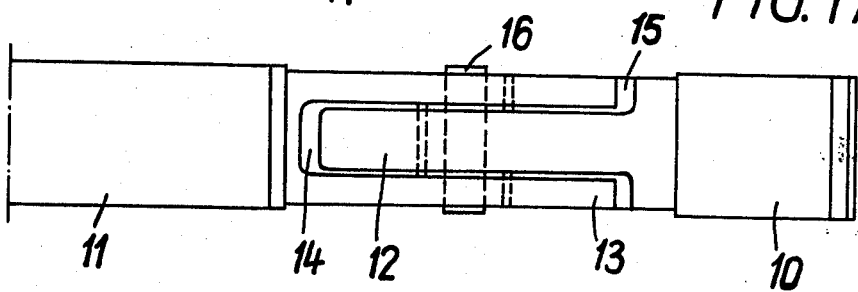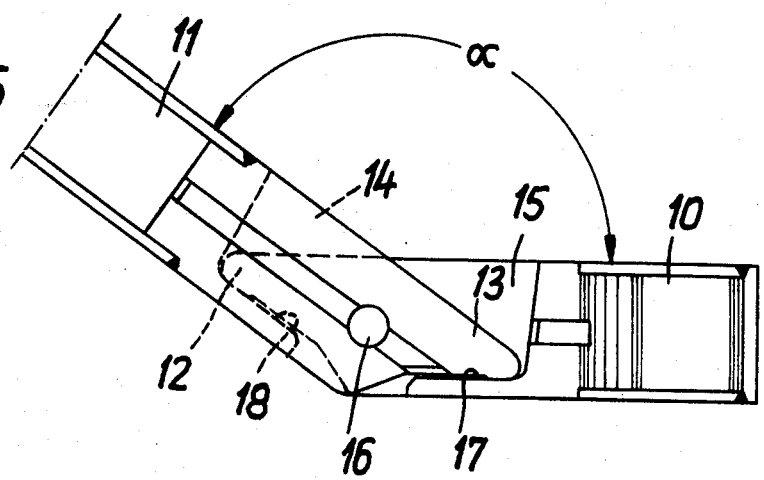

United States Patent Office 3,716,157
Patented Feb. 13, 1973

3,716,157
APPARATUS FOR LOADING OF CARGO ONTO AND UNLOADING CARGO FROM A VEHICLE
Johannes Mittler, Rheinhausen, and Karl Schardey, Rumeln-Kaldenhausen, Germany, assignors to Fried. Krupp Gesellschaft mit beschrankter Haftung, Essen, Germany
Filed Oct. 1, 1971, Ser. No. 185,775
Claims priority, application Germany, Oct. 10, 1970, P 20 49 875.3
Int. Cl. B60p 1/28
U.S. Cl. 214—505                                11 Claims

ABSTRACT OF THE DISCLOSURE

In combination with the platform of a vehicle, an apparatus for loading cargo onto and unloading the same from the vehicle, according to which a platform with pivotable means is adapted to move a cargo receiving means having front and rear extension means onto and from the vehicle, said front extension means having a pivotable supporting section.

---

The present invention relates to an apparatus for loading of cargo onto and unloading the same from a vehicle.

It is an object of the present invention to so construct an apparatus for unloading of cargo from a vehicle with simple means that the cargo may be deposited on the ground without being jolted.

It is a further object of the present invention to create favorable conditions for loading the cargo onto the vehicle.

These and other objects and advantages of the invention will appear more clearly from the following specification in connection with the accompanying drawings, in which:

FIGS. 1-8 are respective side views showing a vehicle with a cargo at different positions of unloading and loading according to the invention.

FIGS. 1a and 1b show details different of the form of FIG. 1.

FIGS. 9-13 illustrate on a larger scale than that of FIGS. 1-8 side views of the lower portion of the cargo with the beam and partially with a bed of the vehicle, said views showing different settings during the unloading process according to the invention.

FIG. 9a is the section along line 9a—9a in FIG. 9.

FIGS. 14 and 15 are yet larger scale views partially showing a forward beam with joint at two different settings according to the invention.

FIG. 17 is the plan view of the forward beam according to FIG. 14.

FIG. 16 is a side view of a vehicle with a cargo corresponding to FIGS. 1-8 showing a modified construction of the apparatus for tilting the cargo according to the invention.

Figure 6:
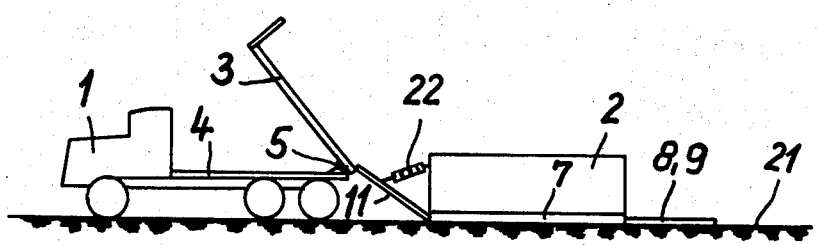

The invention is characterized primarily in that a rearward beam is connectable to the cargo so that it cannot bend and is arranged in such a manner that it projects from the cargo to the rear, that is, in the direction of unloading. The invention is further characterized by an apparatus for tilting the cargo on the vehicle in such a position that the rearward beam rests upon the ground. The invention is yet further characterized in that a forward beam is so connectable to the cargo that it projects forward from the bottom of the cargo at a particular obtuse angle, that is, in the direction opposite to that of the rearward beam and that in relation to the cargo it is inflexible at least to the extent that the particular obtuse angle does not decrease under the load.

Referring now to the drawings in detail, the apparatus shown therein comprises a vehicle 1 (a truck) having a bed 3 for receiving the cargo 2. Bed 3 is pivoted on joints 5 near the rear end of frame 4 of the vehicle 1 by means of a horizontal axle which extends transverse to the direction of travel of the vehicle. The forward end of bed 3 is supported by the vehicle frame 4 by means of a hydraulic power unit (25). FIG. 1 shows the starting or original position of the bed 3, in which position the bed 3 extends horizontally over the vehicle frame 4. In this connection the bed 3 carries the cargo 2 which on one hand engages a wall 6 on the forward end of the bed 3 and on the other hand projects out to the rear beyond the bed. The cargo 2 is transported by the vehicle 1 in this position.

The cargo 2 comprises, for instance, a pallet, that is a support or rack within which are housed, for example, the parts of a collapsible bridge. On the bottom of the pallet there is provided a frame 7 comprising beams; with the driving position shown in FIG. 1, frame 7 is clamped to the bed 3 by any standard or convenient means, not shown. Within the frame 7 there are provided two casings which pass through the entire length of the pallet and in which the beams are slidably and telescopically guided.

In each of the two casings is placed a rearward beam which comprises a long piece 8 and a short piece 9 telescopically guided in the long piece 8. According to FIG. 9, the two long pieces 8 of the rearward beams have been completely moved into the casings of the frame 7, and the two short pieces 9 are inserted as far as possible into the long pieces 8.

Each of the two forward beams, which are guided in the two casings of the frame 7 of the pallet, comprises a short clamping piece 10 and a long spar 11. As shown in FIG. 14, these two parts 10 and 11 have fingers 12 and 13 respectively (FIGS. 14 and 15) the upper sides of which respectively form the continuations of the upper sides of the clamping pieces 10 and spars 11. The fingers 12, 13 taper inasmuch as their bottom sides are slanted. The finger 12 of the clamping piece 10 projects into a recess 14 of the spar 11, and the adjacent finger 13 projects into a recess 15 of the clamping piece 10. Both fingers 12, 13 are pivotally connected to one another by means of transverse bolts 16.

FIG. 14 shows one of the two forward beams in a straightened out position of its two parts 10 and 11. In this position, the forward beam, as shown in FIGS. 9 and 10, may be moved completely into the hollow spaces of the frame 7 of the pallet. FIG. 15 shows that the spar 11, after it has been moved out of the respective casing, is pivoted upwardly about the transverse bolts 16 with respect to the clamping piece 10 which remains in the casing. This pivoting or tilting movement is limited by the fact that the slanted underside of the finger 13 engages a seating surface 17 within the recess 15 of the clamping piece 10 and at the same time the slanted underside of the flanger 12 engages a seating surface 18 in the recess 14. In this instance the spar 11 forms an obtuse angle α with the clamping piece 10.

If the pallet is to be unloaded from the truck 1, the two rearward beams 8, 9, in the manner shown in FIGS. 2 and 10, are moved outwardly toward the rear as far as possible and are secured in this position by means of pins 19, 20. The bed 3 is then tilted upwardly in the joints 5 so that the pallet, after loosening of the above mentioned clamps, slides off. As a result, the rearward ends of the moved out rearward beams 8, 9 strike the ground 21, while the frame 7 of the pallet still rests to a great great extent upon the lower half of the raised bed 3. For this purpose, in certain instances, the truck is driven forward somewhat. If in this connection a difference results between the inclinations of the bed 3 and the underside of the pallet in relation to the ground 21, so that only one edge of the frame 7 rests upon the bed 3, said frame is moved down until its underside surface rests upon the lower half of the bed 3.

As shown in FIGS. 3 and 11, the two forward beams 10, 11 within the casings of the frame 7 are now moved outwardly to such an extent that the spars 11 with the transverse bolts 16 protrude completely from the casings, while the clamping pieces 10 still remain in the casings. They are secured in this position, for example, by bolts. In this instance the spars 11 rest upon the upper half of the bed 3.

The truck 1 is now driven further forwards until the forward edge of the frame 7 reaches the rearward end of the bed 3. As shown in FIGS. 4 and 12, the bed 3 is tilted upwardly to such an extent that the spars 11 form the obtuse angle α with the assembly pieces 10 and consequently with the underside of the frame 7 of the pallet 2. The spars 11 cannot be turned beyond this position since the fingers 12, 13 rest against the seating surfaces 18, 17.

The truck 1 is now driven further forwards. In so doing, the spars 11 on the bed 3 slide slowly off so that the forward end of the frame 7 nears the ground 21. In this connection, the bending moment between the spars 11 and the assembly pieces 10 is transmitted by means of the fingers 12 and 13, while the transverse bolt 16 remains practically free from transverse forces, serving only to transfer tension. Finally, before the spars 11 have slid completely off from the bed 3, the frame 7 reaches the ground 21. The pallet is consequently unloaded upon the ground without jolting. The truck may then be driven away. FIGS. 5 and 13 show the pallet 2 lying upon the ground, in which instance the spars 11, after they are no longer upon the bed 3, are folded down onto the ground.

Figure 7:
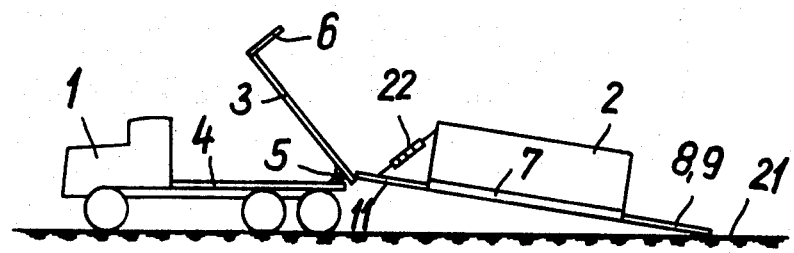
Figure 8:
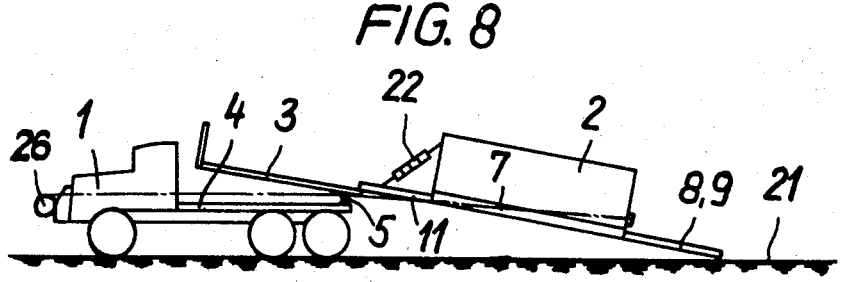

The loading of the cargo 2 upon the truck 1 occurs in the manner shown in FIGS. 6–8. First, the spars 11 are again turned upwards, this being brought about with the aid of double acting hydraulic power units 22 (FIG. 6) which are situated between the spars 11 and the pallet 2. Thereupon, the truck 1 is driven backwards until the rearward end of the steeply positioned bed 3 catches beneath the upper ends of the spars 11, as shown in FIG. 6. Then the spars 11 are relative to the pallet 2 turned downwardly by means of the hydraulic power units 22 until they lie parallel to the bottom of the frame 7. As a result of the supporting of the spars 11 upon the bed 3, the pallet 2 will, in the manner shown in FIG. 7, be raised, while the rearward ends of the extended rearward beam 8, 9 rest upon the ground 21.

Then, according to FIG. 8, the bed 3 is lowered, in which instance the forward ends of the spars 11 are raised somewhat until the bed 3 and the frame 7 with the beams 8, 9 and 10, 11 have the same inclination in relation to the ground 21. Thereupon the pallet 2 may, for example by means of a cable winch 26, be pulled up onto the bed 3, in which case the inclination of the bed 3 becomes progressively greater so that the spars 11 and later the frame 7 have their bottom surfaces resting upon the bed. When the pallet 2 is hereby placed somewhat in the position shown in FIG. 3, the spars 11, after removal of the hydraulic power units 22, are moved into the casings of the frame 7. Then the pallet 2 may be pulled completely upon the bed 3, which can be lowered into the position shown in FIG. 1, whereupon the rearward beam can be moved into the casings.

The loading of the pallet 2 upon the bed 3 may also be accomplished by backing up the truck from the position shown in FIG. 8, the rearward beams being secured against slipping or skidding on the ground 21.

The beams may also be secured to the frame of the cargo in some other manner. For instance, they can be pivotally connected to the frame 7 in such a way that in a driving position similar to that of FIG. 1 they may be folded onto the cargo, and when used for unloading or loading, they may be folded off and locked in the corresponding manner FIG. 1a. It is also possible to separate the beams from the frame 7 and to locate them upon the vehicle and, as the case may be, within a pallet 2. When the beams are to be used, they may be attached to the frame 7, for instance by conveniently fitting them into openings of the frame FIG. 1b.

The tilting of the cargo for the purpose of unloading the vehicle may be accomplished with a device independent of the vehicle if the vehicle does not have a tiltable bed. A device 23 independent of the vehicle 1 for tilting the cargo 2 is indicated in FIG. 16. This device 23 is placed with one arm upon the bed 3, while the other arm supports the frame 7 of the cargo 2. The tilting joint is designated with the reference numeral 24. A power unit 27 lifts up the upper arm with the cargo 2.

It is, of course, to be understood that the present invention is by no means limited to the specific showing in the drawings but also comprises any modifications within the scope of the appended claims.

What we claim is:

1. In combination with a tiltable platform arranged on a vehicle and extending in the longitudinal direction thereof while being tiltable about an axis transverse to the longitudinal axis of the vehicle, an apparatus for loading a cargo onto and unloading the same from said vehicle, which includes: cargo receiving means movable onto and from said platform and adapted to receive and support cargo, front and rear beam means arranged on said cargo receiving means and extending in the longitudinal direction thereof, said rear beam means being movable relative to said cargo receiving means into an outward position so as to form a longitudinal rearward extension of said cargo receiving means, and said platform being tiltable so as to cause said cargo receiving means to slide downwardly on said platform and to cause said rearward extension to contact the ground, said front beam means comprising forward and rearward section means pivotally connected to each other and movable relative to said cargo receiving means into an outward position in which said forward section means and the pivot connection between said forward and rearward section means form projections in front of said cargo receiving means so that said forward section means is pivotable together with said tiltable platform relative to said rearward section means in a direction toward the front portion of said cargo receiving means to form an obtuse angle with said rearward section means, and means associated with said forward and rearward section means for limiting the minimum acute angle said forward and rearward section means can form with each other.

2. An arrangement according to claim 1, in which the bottom portion of said cargo receiving means is provided with passage means, and in which said front and rear beam means are movable into and out of said passage means.

3. An arrangement to claim 1, in which said front and rear beam means are pivotally connected to said cargo receiving means so as selectively to be foldable from a position at the bottom of said cargo receiving means to their outward position and vice versa.

4. In combination with a tiltable platform arranged on a vehicle and extending in the longitudinal direction thereof while being tiltable about an axis transverse to the longitudinal axis of the vehicle, an apparatus for loading a cargo onto and unloading the same from said vehicle, which includes: cargo receiving means movable onto and from said platform and adapted to receive and support cargo, front and rear beam means selectively mountable on said cargo receiving means so as respectively to form longitudinal forward and rearward extensions of said cargo receiving means, and said platform being tiltable so as to cause said cargo receiving means to slide downwardly on said platform and to cause said rearward extension to contact the ground, said front beam means comprising forward and rearward section means pivotally connected to each other and movable relative to said cargo receiving means into an outward position in which said forward section means and the pivot connection between said forward and rearward section means form projections in front of said cargo receiving means so that said forward section means is pivotable together with said tiltable platform relative to said rearward section means in a direction toward the front portion of said cargo receiving means to form an obtuse angle with said rearward section means, and means associated with said forward and rearward section means for limiting the minimum acute angle said forward and rearward section means can form with each other.

5. An arrangement according to claim 1, which includes power operable means operatively connected to said tiltable platform for tilting the same.

6. In combination with a platform arranged on a vehicle and extending in the longitudinal direction thereof, an apparatus for loading a cargo onto and unloading the same from said vehicle, which includes: cargo receiving means movable onto and from said platform and adapted to receive and support cargo, front and rear beam means arranged on said cargo receiving means and extending in the longitudinal direction thereof, said rear beam means being movable relative to said cargo receiving means in an outward position so as to form a longitudinal rearward extension of said cargo receiving means, support means having a first arm adapted to be placed onto and be supported by said platform, said support means also having a second arm pivotally connected to said first arm and tiltable along a vertical plane relative to said first arm, said second arm being adapted to receive said cargo receiving means and to tilt the same so as to cause said cargo receiving means to slide down on said second arm to thereby cause said rearward extension to contact the ground, said front beam means comprising forward and rearward section means pivotally connected to each other and movable relative to said cargo receiving means into an outward position in which said forward section means and the pivot connection between said forward and rearward section means form projections in front of said cargo receiving means so that said forward section means is pivotable together with said tiltable arm relative to said rearward section means in a direction toward the front section of said cargo receiving means to form an obtuse angle with said rearward section means, and means associated with said forward and rearward section means for limiting the minimum acute angle said forward and rearward section means can form with each other.

7. An arrangement according to claim 1, in which said rearward section means is rigidly connectable to said cargo receiving means 8. An arrangement according to claim 1, in which the means associated with said forward and rearward section means for limiting the minimum acute angle said forward and rearward section means can form with each other include one finger each respectively connected to said forward and rearward section means, each of said forward and rearward section means being provided with a recess and an abutment, the recess and abutment of said forward section means being operable to receive and abut the finger of said rearward section means, and the recess and abutment of said rearward section means being adapted to receive and abut the finger of said forward section means.

9. An arrangement according to claim 1, which includes power operable means associated with said forward section means and operable to pivot the latter in a direction so that the outermost end of said forward section means moves away from said cargo receiving means.

10. In combination with a platform arranged on a vehicle and extending in the longitudinal direction thereof, an apparatus for loading a cargo onto and unloading the same from said vehicle, which includes: a cargo receiving means, said platform being adapted to support said cargo receiving means, said cargo receiving means being movable relative to said platform for respectively loading said cargo receiving means onto the vehicle and unloading said cargo receiving means from said vehicle, front and rear beam means adapted to be arranged on said cargo receiving means for extending in the longitudinal direction thereof so as to form a longitudinal rearward extension of said cargo receiving means and also to form a longitudinal forward extension of said cargo receiving means, said forward extension comprising arm means pivotable toward said cargo receiving means, abutment means for limiting the pivoting movement of said forward extension toward said cargo receiving means, and pivotable means adapted to be supported by said platform and tiltable about an axis transverse to the longitudinal direction of the vehicle for tilting said cargo receiving means so as to cause the latter to slide at an incline downwardly.

11. An arrangement according to claim 1, which includes lifting means for pulling the cargo receiving means onto said platform.

References Cited

UNITED STATES PATENTS 2,823,818   2/1958   Chastain et al. _____ 214—505
3,471,048  10/1969   Terho _____ 214—517 X ALBERT J. MAKAY, Primary Examiner U.S. Cl. X.R.

214—517, 515